United States Patent
Maibach et al.

(10) Patent No.: US 10,442,636 B2
(45) Date of Patent: Oct. 15, 2019

(54) TEMPORARY STORAGE DEVICE AND METHOD FOR TEMPORARY STORAGE

(71) Applicants: FINATEC HOLDING AG, Brügg bei Biel (CH); Fridolin Maibach; Matthias Hermle; Bernhard Kubalek; Martin Gerber; Christian Gräser

(72) Inventors: Fridolin Maibach, Safnern (CH); Matthias Hermle, Brügg bei Biel (CH); Bernhard Kubalek, Unterramsern (CH); Martin Gerber, Biel (CH); Christian Gräser, Hinwil (CH)

(73) Assignee: Finatec Holding AG, Brügg bei Biel (CH)

( * ) Notice: Subject to any disclaimer, the term of this patent is extended or adjusted under 35 U.S.C. 154(b) by 0 days.

(21) Appl. No.: 15/768,663

(22) PCT Filed: Oct. 13, 2016

(86) PCT No.: PCT/EP2016/074592
§ 371 (c)(1),
(2) Date: Apr. 16, 2018

(87) PCT Pub. No.: WO2017/064186
PCT Pub. Date: Apr. 20, 2017

(65) Prior Publication Data
US 2018/0297789 A1  Oct. 18, 2018

(30) Foreign Application Priority Data
Oct. 16, 2015 (DE) .......... 10 2015 117 669

(51) Int. Cl.
*B65G 47/80* (2006.01)
*B65G 29/00* (2006.01)
(Continued)

(52) U.S. Cl.
CPC ............. *B65G 47/80* (2013.01); *B65G 29/00* (2013.01); *B65G 29/02* (2013.01); *B65G 47/24* (2013.01); *B65G 47/5136* (2013.01)

(58) Field of Classification Search
CPC .... B65G 47/80; B65G 47/24; B65G 47/5136; B65G 47/1457; B65G 47/1464; B65G 29/02; B65G 29/00; B65B 35/26
(Continued)

(56) References Cited

U.S. PATENT DOCUMENTS

| 774,177 A | 11/1904 | Hopkins et al. |
| 2,873,019 A * | 2/1959 | Kay .............. B65G 29/00 |
| | | 198/463.4 |

(Continued)

FOREIGN PATENT DOCUMENTS

| EP | 0050892 A2 | 5/1982 |
| EP | 2733096 A1 | 5/2014 |

(Continued)

OTHER PUBLICATIONS

European Patent Office, Rijswijk, Netherlands, International Search Report of International Application No. PCT/EP2016/074592 dated Jan. 25, 2017, 3 pages.

*Primary Examiner* — William R Harp
(74) *Attorney, Agent, or Firm* — Brinks Gilson & Lione

(57) ABSTRACT

An interim storage device (1) for separated and oriented objects (2) includes an object inlet (3), a rotating turntable (4), a spiral-shaped object path (5), and an object outlet (6). Either the object inlet (5) or the object outlet (6) is in line with the spiral origin (7) while the other is in line with the spiral end (8). The spiral-shaped object path (5) features a fixed spiral (9) which is placed above the turntable (4) without making contact.

11 Claims, 3 Drawing Sheets

(51) Int. Cl.
 *B65G 47/51* (2006.01)
 *B65G 29/02* (2006.01)
 *B65G 47/24* (2006.01)

(58) Field of Classification Search
 USPC .................................................. 198/392, 778
 See application file for complete search history.

(56) References Cited

U.S. PATENT DOCUMENTS

| | | | | |
|---|---|---|---|---|
| 2,941,651 | A * | 6/1960 | Hutter | B65G 47/1464 |
| | | | | 198/392 |
| 3,300,022 | A | 1/1967 | Sterling | |
| 3,640,373 | A | 2/1972 | Seragnoli | |
| 5,234,098 | A | 8/1993 | Pedersen | |
| 7,757,837 | B2 * | 7/2010 | Jones | B23Q 7/008 |
| | | | | 198/347.1 |
| 9,309,060 | B2 * | 4/2016 | Pucciani | B65G 47/1407 |

FOREIGN PATENT DOCUMENTS

| | | | |
|---|---|---|---|
| JP | 2009102107 | A | 5/2009 |
| JP | 2010058883 | A | 3/2010 |
| WO | 2008/030937 | A2 | 3/2008 |
| WO | 2014/192985 | A2 | 12/2014 |

\* cited by examiner

TEMPORARY STORAGE DEVICE AND METHOD FOR TEMPORARY STORAGE

TECHNICAL FIELD

The present invention pertains to the technical field of machines for the production and processing of caps, specifically screw caps, such as those that are used on PET bottles. Specifically, the invention pertains to the field of transporting these caps between the individual handling stations via a mechanism and a process.

BACKGROUND

Caps can be made either of metal or plastic, wherein the latter are normally produced in an injection molding machine, ejected, cooled in a bulk container during subsequent transport, oriented upon leaving the bulk container and placed in gapless lines and subsequently separated and cut in or before a cutting machine to produce a tamper-proof cap, or are further processed with another machine. Subsequently the screw caps can be transported to filling stations and there be screwed onto filled containers. Before and/or after the cutting machine, the screw caps pass through a quality control, with specific consideration of color errors, incomplete injections, holes, burrs, injection points, the presence and the quality of gas barrier layers or other such attributes, whereby faulty screw caps are sorted out. Such in-line setups have since attained product-related processing speeds of 3,500 to 4,000 products per minute or more. Similar procedural steps with similar processing speeds are required for metal caps.

It is therefore particularly important to provide the individual work stations or handling stations continuously with caps, specifically screw caps, as well as to allow for corresponding interim storage. In this continuous supply line it is particularly important that the already-oriented objects not be changed in their orientation when placed into interim storage, so that the machines being supplied with objects can operate continuously and maintain high processing speeds. Furthermore it is important to introduce the oriented objects to the machines themselves, or to conveyor systems to the machines, with a corresponding dynamic pressure, so that they are constantly and at all times able to accept an object or have an object delivered to them, so that no uncapped containers result.

In general, the invention pertains to an interim storage system for objects that have already been oriented. The interim storage system in accordance with this invention additionally includes an object inlet, a rotating turntable, a fixed spiral-shaped object path, and an object outlet, wherein either the object inlet or the object outlet is aligned with the origin of the spiral, while the other is aligned with the end of the spiral. More specifically, the invention pertains to an interim storage system for in-line conveyed and oriented screw caps, particularly those made of plastic, with the following characteristics.

A rotating buffer storage system is known from WO 2008/030 937 A2, in which a driven turntable includes a spiral-shaped barrier that is connected to it, and thus rotating with it, which defines a product path from the outer area of the turntable to the inner area, wherein a fixed bridge spans the turntable, from which fingers protrude into the product path, for example to measure the speed of the objects. The rotation speed of the turntable is controlled by a computer. After complete filling, the buffer storage system is emptied, meaning that it works in batch mode and is therefore not ideal for the application covered by this invention.

U.S. Pat. No. 5,234,098 A demonstrates a turntable with a non-rotating but vibrating spiral path which is continuously supplied with bulk frozen food items such as peas, wherein the individual peas are separated out of frozen groups upon passing through the vibrating spiral path with increasing distance from one another, so that the peas leave the turntable in a single row. Understandably, the orientation of the peas in this process is unimportant.

SUMMARY

With this background, it is the goal of this invention to provide a continuous interim storage solution of already-oriented objects, such as screw caps, via a mechanism and a process.

This task is accomplished by an interim storage system in which the spiral-shaped object path includes a fixed spiral above the turntable which is completely separate from the turntable. The spiral-shaped object path permits optimal usage of a circular surface for the interim storage of objects. In accordance with the invention, the spiral is an Archimedian spiral, i.e. a spiral in which the radius increases with a linear relation to the angle of rotation. This allows for the most uniform movement and direction of objects within the object path. Due to the fixed nature of the spiral, the objects are not bumped or jostled and thus can slide relatively smoothly along the spiral wall. Due to the fact that the spiral does not touch the turntable, there is no wear to the spiral or to the turntable, and also no friction. Thus the turntable can rotate easily with a constant speed.

The design of the invention allows that the distance between the spiral and the turntable is adjustable, specifically between 0.25 mm and 5 mm, preferably between 0.4 mm and 2 mm, specifically between 0.5 mm and 1.75 mm. This design advantageously allows for adjustment of the mechanism to accommodate differently sized and shaped objects. Simultaneously, this design can influence the airflow over the turntable under operating conditions and reduce turbulence.

When the spiral is established as an Archimedian spiral and, preferably, made from a solid piece of plastic or aluminum, the kinks, transitions, and uneven curves that result from the bending of flat material are avoided. An especially smooth slipway is hereby created, which brakes or diverts the objects such as screw caps which are already oriented, aligned, and in contact with each other. In accordance with the invention, the spiral can also be created by other primary shaping processes, particularly by 3D printing. This method also avoids the creation of transitions or kinks.

In a refinement of the invention, the turntable includes a flat and/or smooth surface, and/or is designed to rotate at a constant angular velocity. This facilitates the sliding of objects over the turntable.

A particularly advantageous refinement of this invention is a mechanism for injecting a directed gas stream. This gas stream constitutes a second driving force for the objects, which in combination with the rotating turntable ensures sufficient pressure on the objects at the object outlet, so that a subsequent handling station such as a cutting machine or a conveyor mechanism to a handling station will always have an uninterrupted supply of objects, even in the event that the interim storage system is nearly empty.

The design of the invention allows that the mechanism for injecting a directed gas stream includes three to 16 arms radiating outward from the center of the spiral, whereby each arm includes two or more outlet ports, specifically outlet ports not orthogonally positioned in relation to the surface of the turntable. This allows for a largely homogeneous flow field within the interim storage area, so that an object within the spiral experiences a force of equal strength and direction toward the object outlet along its entire length of travel. The greater number of arms avoids individual pushes, so that the objects slide evenly and thus have a lower risk of losing their spatial orientation, being damaged, or bunching up.

It is also advantageous that the arms have a curving progression, specifically that they extend in a circular arc. The driving air is hereby injected even better and more homogeneously. In this case, "air" can also signify an inert gas such as nitrogen or argon, as well as pressurized air, purified pressurized air, air from a compressor, or another gas.

In accordance with the invention, an alternative to the arms described is provided, in that the mechanism for injecting a directed gas flow has one or more gas reservoirs, which in turn have one or more gas outlets, specifically in the form of slots. The gas reservoirs are designed as cylindrical or box-shaped containers, which are located above the spiral and can also assume a supporting function in place of the arms, although they do not have to do so. They can be segmented, for example consisting of two, three, or four individually removable partial containers. In accordance with the invention, the gas reservoir includes one or more internal gas guide surfaces. Gas reservoirs and guide surfaces serve to always supply sufficient gas to buffer pressure spikes and thus enable the most uniform gas flow possible. In accordance with the invention the gas outlets, specifically slots, extend radially, but can also be designed in the same manner as the arms previously described, so that they include a curved progression and are not oriented orthogonally to the turntable surface.

If the angular velocity of the turntable differs from the outflow velocity of the gas, specifically if it is slower, then a constant basic transport of objects is achieved by the turntable, i.e. with a nearly constant angular velocity. Beyond this basic transport, faster transport of the objects is facilitated by the air stream, so that any gaps which may form in the stream of objects within the object path are closed and a sufficient number of caps is always present at the object outlet. Together, these two manners of propulsion of varying speeds assure a constant supply to the downstream processing machines according to the invention.

The method of interim storage of oriented objects between two processing operations includes the following steps: a) introduction of oriented objects into an interim storage device as specified above, b) movement of the oriented objects along a spiral-shaped path via a rotating turntable at a first speed, c) superimposing the first speed with a second, higher speed created by injection of gas, and d) exit of the oriented objects from the interim storage device. The advantages of this method have already been described.

The invention will be described in its preferred embodiment with reference to exemplary illustrations, wherein additional advantageous details are shown in the illustrated figures. Functionally identical parts are provided with the same reference numbers.

BRIEF DESCRIPTION OF THE DRAWINGS

The illustrated figures show the following in detail.

DETAILED DESCRIPTION OF THE DRAWINGS

Figure 1:
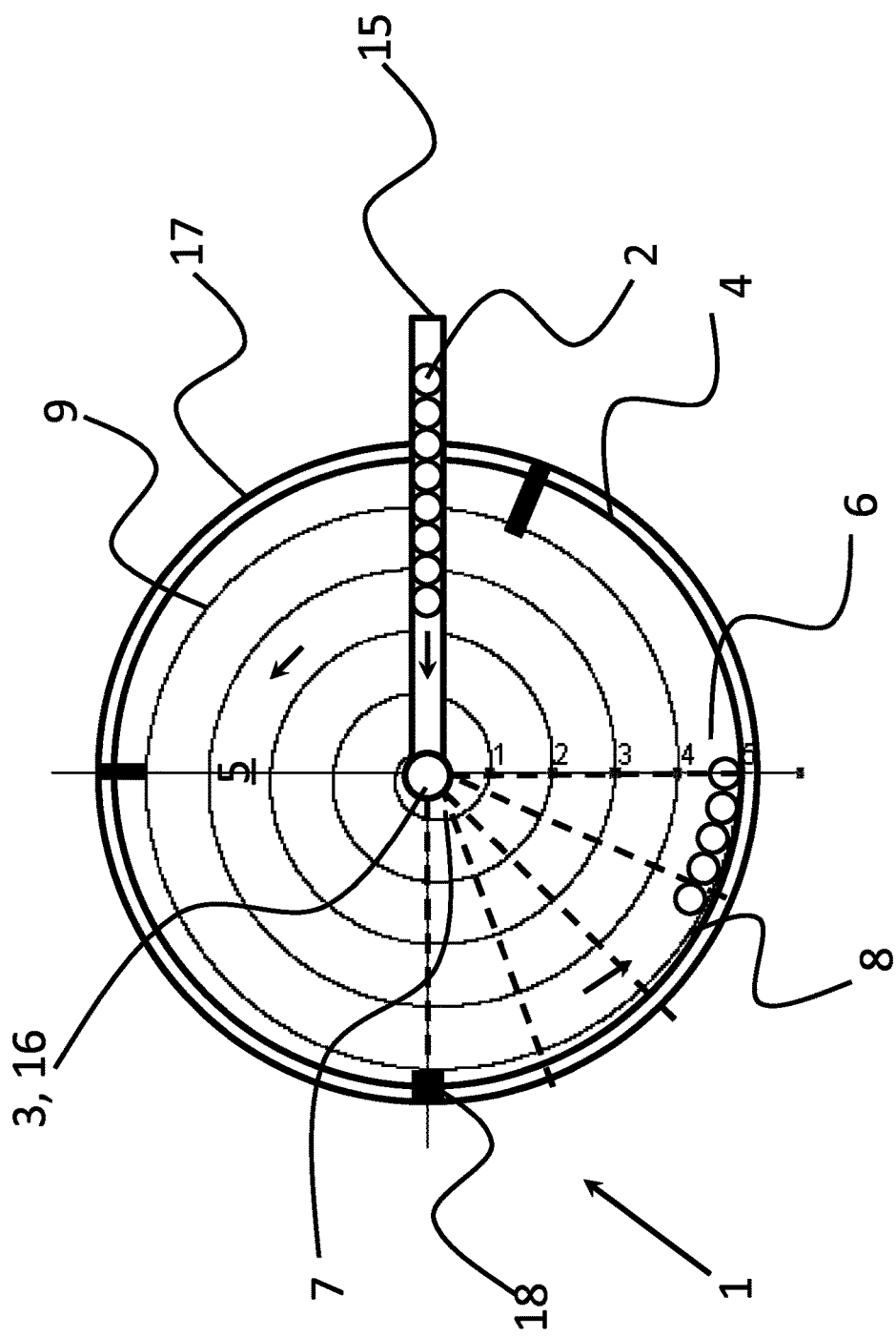
FIG. 1: an overview of a mechanism in accordance with the invention.

FIG. 1 shows a schematic overview of an interim storage system in accordance with this invention. In the shown example, the storage system has a diameter of 1 m, although the diameter can vary from 0.5 to 2 m depending on the respective embodiment. This embodiment thus has an object path of about 9 m. The interim storage device is surrounded by a housing 17. Drive mechanisms, supply lines, control units, sensors for airflow, measurement of the fullness of the interim storage device, transport speed, etc. are not depicted here.

A feeder 15, shown only schematically, for example a (vacuum) conveyor belt, carries object 2, in this case screw caps, from a production facility (not shown) with subsequent separation and orientation to an object inlet 3, which is located at the spiral origin 7. The screw caps which have already been oriented correctly for subsequent processing enter the object path 5—specifically on its inclined plane 16, the angle of which preferably increases with increasing proximity to object path 5—from above via the object inlet 3. As a result, the initially horizontal movement of the screw caps is relatively gently changed into a vertical movement, without losing orientation. Alternately, object inlet 3 could be designed as a purely vertical path, in which case a correspondingly oriented deflecting and baffle plate or similar device would be required to alter the direction of movement of the screw caps.

A feeder 2 supplying objects from beneath the turntable 4 would also be in accordance with the invention. The object path 5 of the interim storage device 1 begins at the spiral origin 7 and continues in an outward spiral to the spiral end 8. The object path 5 is formed by a turntable 4 and a vertically separated fixed, non-rotating spiral 9. The spiral 9 is made of a smooth-surfaced material such as aluminum which is abrasion-resistant with respect to the product and is preferably machined from solid stock or produced by 3D printing. This last feature ensures a uniform increase in the radius of the spiral, without butt joints, bulges, or kinks. With the high feed rate of screw caps that is required, these anomalies could lead to local accumulations of caps and thereby eventually lead to blockage of the object path 5.

Figure 2:
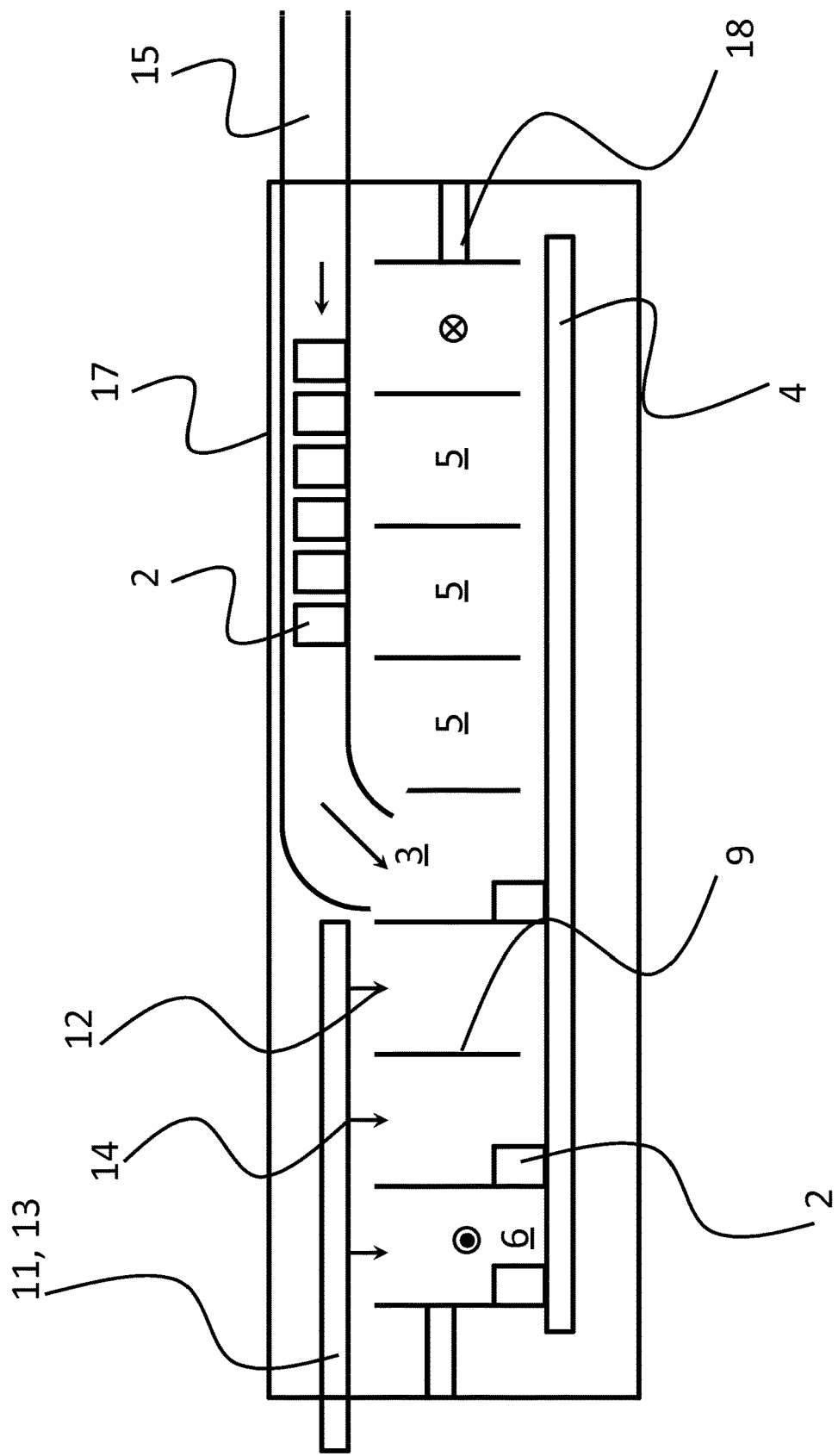
FIG. 2: a sectional view of this mechanism.

As can be seen in FIG. 2, there is a separation between the spiral 9 and the turntable 4, which is between 0.25 and 5 mm, preferably between 0.4 and 2 mm, particularly between 0.5 and 1.75 mm. As a result, any unevenness in the turntable 4 which may arise during operation will not result in friction with the underside of the spiral 9 which faces it, and simultaneously the airflow within the interim storage device between the individual windings of the spiral is facilitated (see below). The wall thickness of the spiral 9 is consistent over the entire progression of the spiral, but can also be thinner in the area of the spiral origin 7 than in the area of the spiral end 8 or preferably the entire outermost spiral winding. This reduces the total weight of the spiral 9 without affecting its stability, as the relatively large number of windings at the spiral origin balances the relatively small number of windings at the spiral end. Additionally the latter facilitates the mounting of spiral 9 on a housing 17 of the interim storage device 1, so that it is suspended above the turntable.

The schematic of FIG. 1 only depicts an attachment point in the edge area of the spiral 9, however attachment via the support which entirely or partially bridges the object path 5 would also be in accordance with the invention. It is preferable that these attachment points to the spiral can be released for maintenance purposes or for the purpose of retooling for a new product geometry.

The spiral 9 includes five windings here. Five arms 13 are depicted as dashed lines in the left lower quadrant of the spiral 9, which are part of a mechanism 11 which injects air, nitrogen, or another gas into the object path from above. The arms 13 are evenly distributed over the base of the spiral 9. In other embodiments, other numbers and orientations of arms can be used, specifically more or fewer arms than in this example.

The turntable 4 includes a smooth surface on the side facing the spiral 5, for example a glass plate—also hardened. Metal plates or plastic surfaces are also ideal as smooth surfaces, the latter particularly if it is abrasion-resistant, to which end fiber reinforcement may be employed. This surface can hereby either constitute a layer applied to a base body, or can form the entire body of the turntable. During operation the turntable 4 rotates with a constant angular velocity in order to provide basic momentum for the products and to ensure the most even movement possible within the object path 5.

The spiral end 8 simultaneously forms the object outlet 6, from which the cached screw caps are transported to/taken by, for example, a cutting machine (not depicted). This is normally accomplished by another turntable, possibly a meshing turntable, the circumference of which is designed with product pockets in a wave-like form, into which the screw caps are taken as products. This object outlet 6 can also be specially shaped, i.e. horizontally inclined, narrowing to the diameter of one screw cap and adjustable in its degree of narrowing; other substrates or additional guide elements such as a feed path from above can also be designed, specifically a spring-loaded feeder which serves to hold down the products, preferably with an inlet area/chamfer. Finally, in accordance with the invention the products can also be transferred to a connecting system, rather than directly to a cutting machine. Additionally, in accordance with the invention the products can be moved to an additional transport path, such as an air duct, which moves the screw caps to another handling station and which can have a length of 1 m or 1.5 m.

FIG. 2 shows a schematic cross-section through mechanism 1 running through the center of the circle of the turntable 4, in accordance with the invention. Notice in particular the walls of the housing 17. The housing 17 can be equipped with a hatch, specifically on its upper side, in order to enable (maintenance) access to the storage path. The feeder 15 can be placed above the mechanism and can either pass through the housing cover from above or, as illustrated, have a lateral inlet to the housing 17. Also notice the rotational direction of the turntable 4 and the cut walls of the spiral, spaced with an air gap. This air gap also facilitates the movement of the gas flow from one spiral winding to the next, so that it flows as uniformly as possible along the object path, ideally as a laminar flow. The turntable drive, controls, all sensors, and all inlet and outlet lines are omitted. The machine frame upon which the mechanism 1 is mounted is also omitted.

Attached to or molded into this frame are support arms 18 which hold the spiral 9 and keep it suspended above the turntable 4. Here as well, the illustration only shows the side-mounted design with the mounting point being on the outermost winding of the spiral, other methods and locations of attachment would also be in accordance with the invention, for example hanging from a frame or suspended outside the turntable.

A mechanism 11 is located above the edge of the spiral 9 which is facing away from the turntable 4. The mechanism includes arms 13 with outlet ports 14, which inject a gas stream, specifically an air stream. Although depicted vertically here, the outlet direction of the air or nitrogen stream is preferably directed at an oblique downward angle in order to add an additional force component to the screw caps 2 in the direction of feed. Instead of a fixed angle, an adjustable angle between an almost vertical orientation and an almost horizontal orientation, or even an angle that can be adjusted during operation, would be in accordance with the invention. The arms 13 are arranged here with radial uniformity, with an angle of 45° between two adjacent arms. It would also be in accordance with the invention to have angles of 45°, 60°, 72°, 90°, and 180°, or in other words, 8 to 18 arms. Here a balance must be struck between the most uniform airflow in every section of the object path, and a high design complexity and excessive complications in accessing the object path from above. The latter is always necessary in the event of a blockage in the object path which must then be addressed manually. A connection between the arms 13 and a gas supply is not depicted. This can be centralized for all arms, or decentralized for a single arm or a group of arms.

Figure 3:
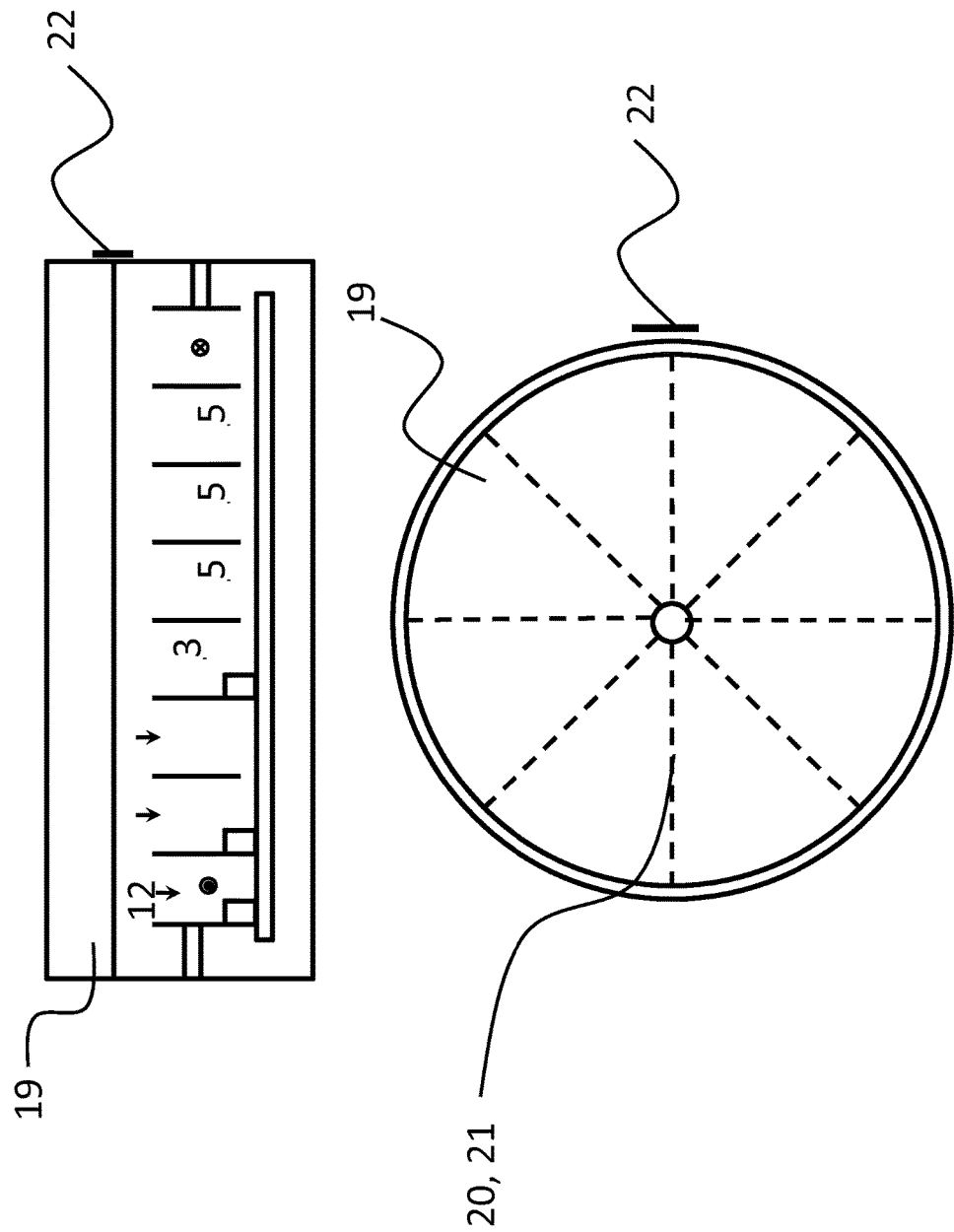
FIG. 3: a schematic view of a third embodiment.

FIG. 3 schematically depicts an additional embodiment with a gas reservoir 19. Here only one segment is displayed, which pivots on a hinge 22. The floor of the gas reservoir 19 facing the turntable 4 includes slots 21, which are directed radially and non-orthogonally in relation to the surface of the turntable 4.

As previously mentioned, the interim storage device in accordance with the invention can be incorporated into a transport path, particularly one composed of air ducts, also called jet streams. In this case, the products are transported into and away from the storage device by the transport path. As a result, the storage device in accordance with the invention can be installed at any suitable location, and need not necessarily be in immediate proximity to other modules in the in-line system.

While the above description constitutes the preferred embodiments of the present invention, it will be appreciated that the invention is susceptible to modification, variation and change without departing from the proper scope and fair meaning of the accompanying claims.

What is claimed is:

1. An interim storage device (1) for separated and oriented objects (2), the interim storage device comprising: an object inlet (3),
    a rotating turntable (4),
    a spiral-shaped object path (5),
    an object outlet (6), and
    a mechanism (11) for injecting a directed gas stream (12), the mechanism composed of three through 16 arms (13) radiating outward from the center of the spiral, each of the arms (13) including two or more outlet ports,
    wherein one of the object inlet (3) or the object outlet (6) is in line with the spiral origin (7), while the other one of the object inlet (3) or the object outlet (6) is in line with the spiral end (8), wherein the spiral-shaped object path (5) includes a fixed spiral (9) which is placed above the turntable (4) without making contact.

2. The interim storage device (1) in accordance with claim 1, wherein the distance of the spiral (9) in relation to the turntable (4) is adjustable.

3. The interim storage device (1) in accordance with claim 1, wherein the spiral (9) is an Archimedian spiral fabricated from a solid plastic or aluminum body.

4. The interim storage device (1) in accordance with claim 1, wherein the turntable (4) comprises a surface that is flat or smooth or both flat and smooth.

5. The interim storage device (1) in accordance with claim 1, wherein, wherein the two or more outlet ports (14) of each arm are not orthogonally positioned in relation to the surface of the turntable (10).

6. The interim storage device (1) in accordance with claim 5, wherein the arms have a curving progression.

7. The interim storage device (1) in accordance with claim 1, wherein the mechanism (11) for injecting a directed gas stream (12) comprises one or more gas reservoirs (19), which in turn have one or more gas outlets (20).

8. The interim storage device (1) in accordance with claim 1, wherein the object inlet (3) is located on a side of the turntable (4) facing away from the spiral (9).

9. The interim storage device in accordance with claim 1, wherein the turntable is designed to rotate at a constant angular velocity.

10. An interim storage device (1) for separated and oriented objects (2), the interim storage device comprising:
an object inlet (3),
a rotating turntable (4),
a spiral-shaped object path (5),
an object outlet (6), and
a mechanism (11) for injecting a directed gas stream (12),
wherein one of the object inlet (3) or the object outlet (6) is in line with the spiral origin (7), while the other one of the object inlet (3) or the object outlet (6) is in line with the spiral end (8), wherein the spiral-shaped object path (5) includes a fixed spiral (9) which is placed above the turntable (4) without making contact, and
wherein the turntable (4) has an angular velocity and the gas stream has an outflow velocity, wherein the angular velocity of the turntable (4) differs from the outflow velocity of the gas stream.

11. A method for interim storage of oriented objects between two processing operations, the method comprising the following steps:
introducing oriented objects into the interim storage device according to claim 1;
moving the oriented objects along the spiral-shaped object path by the rotating turntable at a first speed;
superimposing the first speed with a second, higher speed created by injection of gas from the two or more outlet ports in each of the three to 16 arms, and
removing the oriented objects from the interim storage unit.

* * * * *